INVENTOR.
PETER F. GIRARD
BY
Knox & Knox

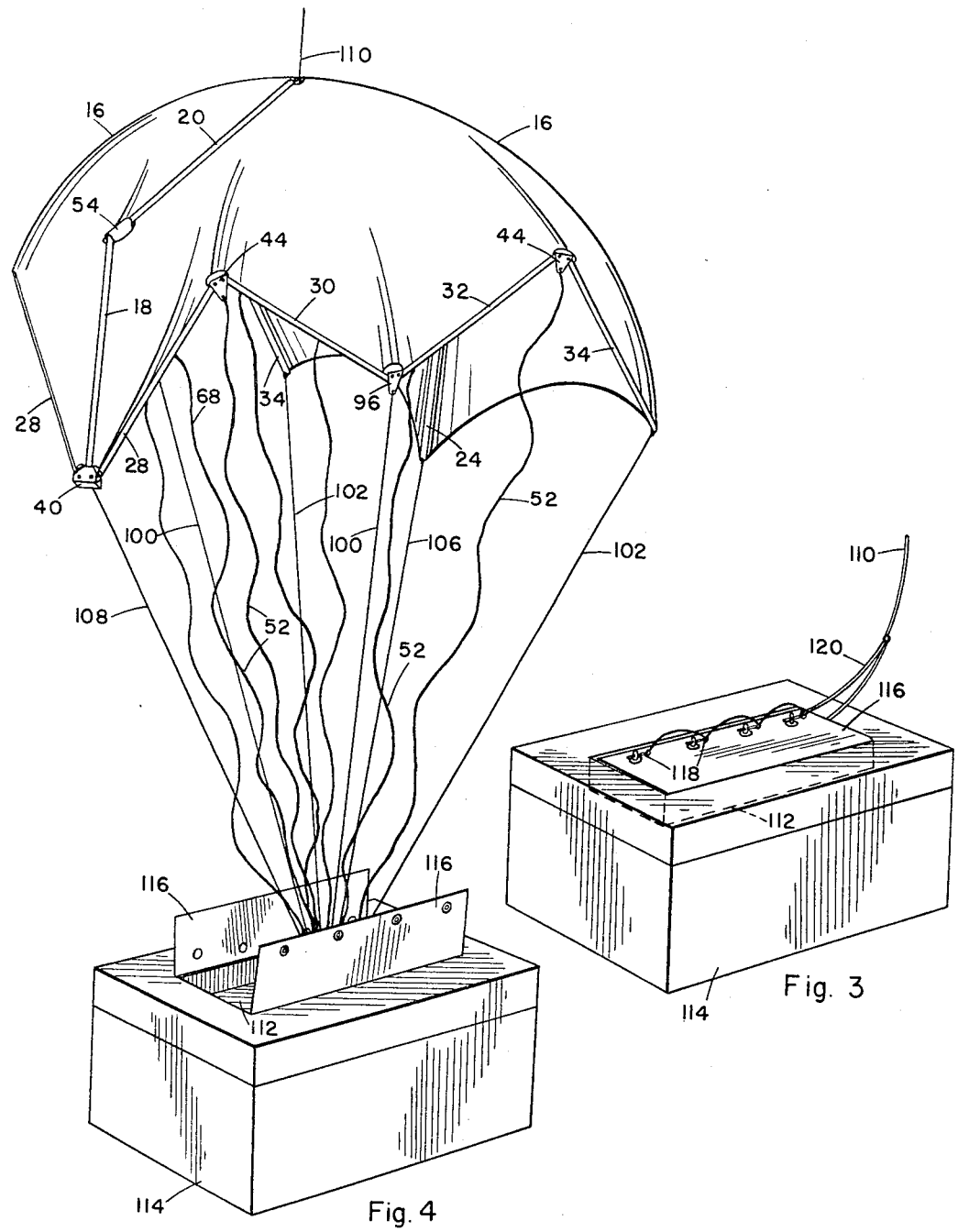

May 7, 1968 P. F. GIRARD 3,381,919
FLEXIBLE WING AERIAL DELIVERY SYSTEM
Filed July 25, 1966 4 Sheets-Sheet 4

INVENTOR.
PETER F. GIRARD
BY Knox & Knox

United States Patent Office 3,381,919
Patented May 7, 1968

3,381,919
FLEXIBLE WING AERIAL DELIVERY SYSTEM
Peter F. Girard, La Mesa, Calif., assignor to The Ryan Aeronautical Co., San Diego, Calif.
Filed July 25, 1966, Ser. No. 567,525
4 Claims. (Cl. 244—49)

ABSTRACT OF THE DISCLOSURE

The flexible wing has a supporting frame of small cross section rigid members hinged together, so that the frame is foldable into a small package. Certain of the hinges are spring biased, to initiate opening of the structure when released, deployment being completed by air flow and the fully deployed configuration of the wing being maintained by the shroud lines connecting the wing to the payload.

---

The present invention relates to aircraft and specifically to a flexible wing aerial delivery system by which a payload may be air dropped and flown to a predetermined landing site with considerable accuracy. The wing structure is stowable into a small space and is self-erecting upon dropping, without requiring any sources of power or special services.

Flexible wings have been developed and proposed for a wide variety of uses, including that of delivering payloads from the air in place of a conventional parachute. The primary advantage in using a flexible wing for this purpose is the extended lateral range over which the payload can be carried after dropping, since the wing can be controlled in the manner of a glider. In order to stow the wing in a compact manner for attachment to a payload the entire structure must be collapsible or foldable. This can be accomplished by using hollow flexible supporting members which are inflated by air pressure to extend and rigidize the structure, a particular example of this being shown in U.S. Patent No. 3,141,640, entitled, Method of Deploying Flexible Wing Glider. While this arrangement is practical for many purposes, it does require periodic maintenance and checking, particularly with regard to the compressed air supply and controls, to ensure reliable operation.

The wing disclosed herein avoids the above mentioned drawbacks while retaining functional advantages, utilizing a supporting frame of rigid members hinged together in a novel manner which allows the wing to be folded in a simple manner into a small package and will, when released, extend to a stable flight condition under the influence of the air flow encounted in free fall. The rigid members are much smaller in cross section and thus have less aerodynamic drag than inflatable members. Being purely mechanical and having no special actuating means, the wing opening action is simple and reliable.

The wing, its structure and operation are illustrated in the drawings, in which:

FIGURE 3 is a perspective view of a typical payload with the wing stowed thereon;

FIGURE 4 is a perspective view of the wing in initial opening position;

Similar characters of reference indicate similar or identical elements and portions throughout the specification and throughout the views of the drawings.

Figures 1, 2:
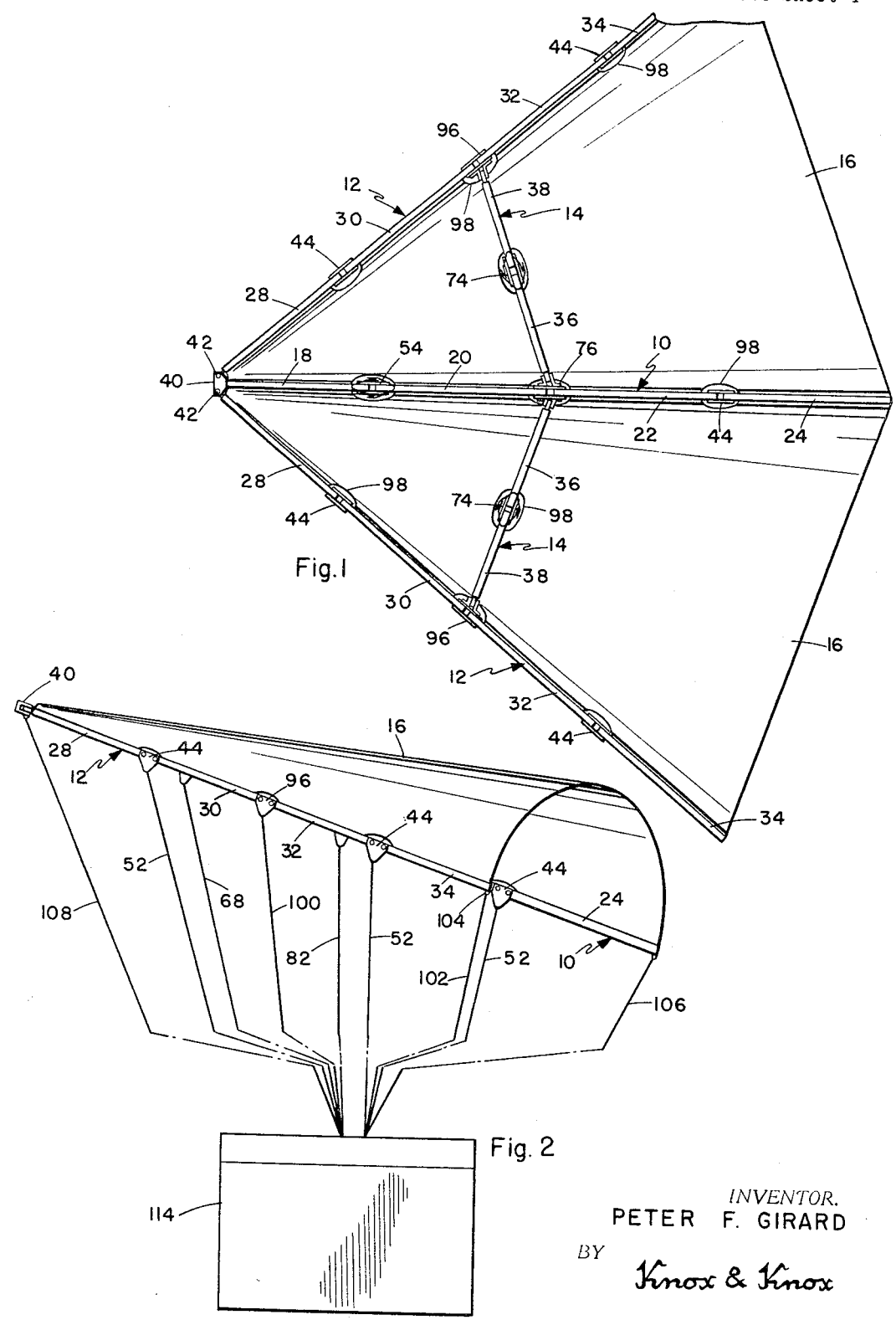
FIGURE 1 is a bottom plan view of the extended wing.
FIGURE 2 is a side elevation view of the wing showing the attachment of a payload in flight position.

The wing as illustrated follows the well known flexible wing configuration and has a supporting frame comprising a longitudinal central keel 10, with leading edge members 12 extending rearwardly from the forward end of the keel on opposite sides thereof. Connected between keel 10 and leading edge members 12 at approximately the mid-points are spreader bars 14 which hold the frame structure in extended position. Flexible lifting panels 16 of substantially triangular shape are attached between the keel 10 and each leading edge member 12 to complete the basic wing structure.

Keel 10 is divided into four poritions, a front member 18, a front center member 20, a rear center member 22 and a rear member 24, all preferably of substantially equal length. Each leading edge member 12 is similarly divided into four portions, a front member 28, a front center member 30, a rear center member 32 and a rear member 34. Each spreader bar 14 is in two equal sections, an inner member 36 and an outer member 38. Fixed to the forward end of keel member 18 is an apex fitting 40, to which members 28 are connected by hinge pins 42 to swing laterally on opposite sides of the keel.

Figure 5:
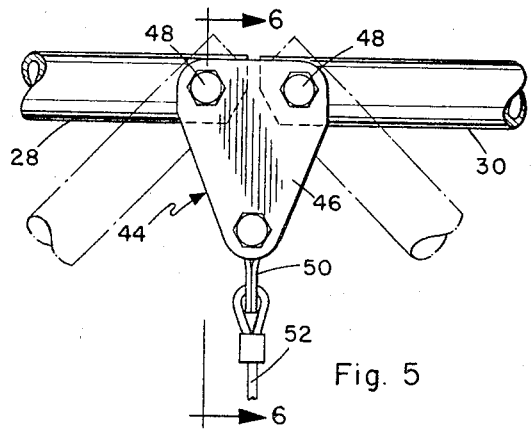
FIGURE 5 is a side elevation view of one type of hinge joint used in the structure.
Figure 6:
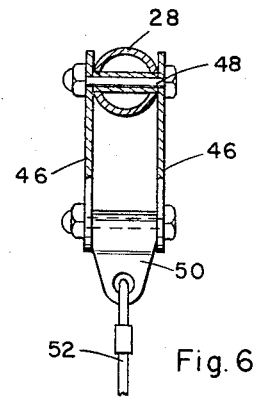
FIGURE 6 is a sectional view taken on line 6—6 of FIGURE 5.

Members 28 and 30 are interconnected by a simple hinge 44, illustrated in FIGURES 5 and 6, the hinge comprising a pair of generally triangular hinge plates 46 between which the ends of said members are secured by hinge pins 48. The members are indicated as tubular with sleeves fitted on the hinge pins to ensure a secure yet freely pivotal joint, but other structural arrangements may be used. It should be noted that all hinge pins in the frame structure, except pins 42 in the apex fitting 40, are horizontal, or in the general plane of the wing, to ensure rigidity of the extended structure in the horizontal plane. Hinge plates 46 extend downwardly and between the lower ends thereof is secured a clevis 50, to which is attached a shroud line 52. This same hinge arrangement is used to connect members 32 and 34 and members 22 and 24, two of these hinges being used in each leading edge member 12 and one in the rear portion of keel 10, complete with the shroud line attachment.

Figure 7:
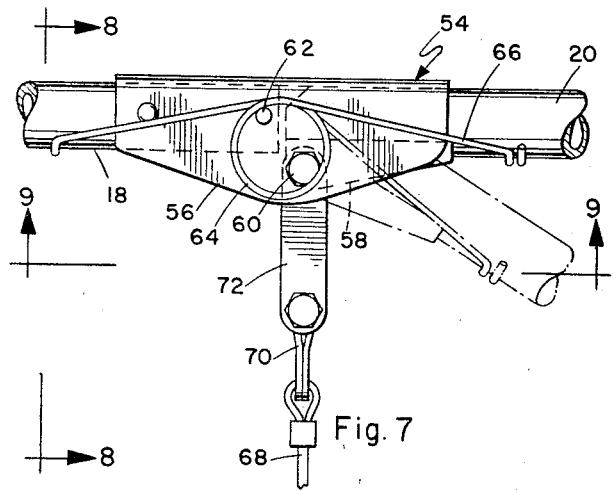
FIGURE 7 is a side elevtaion view of a spring biased hinge joint.
Figure 8:
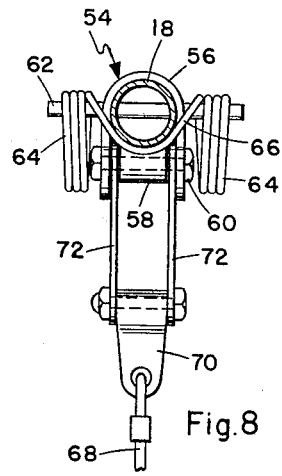
FIGURE 8 is a sectional view taken on line 8—8 of FIGURE 7.
Figure 9:
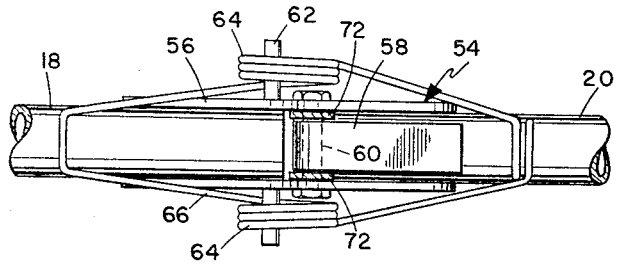
FIGURE 9 is a sectional view taken on line 9—9 of FIGURE 7.

The keel members 18 and 20 are connected by a second type of hinge 54 shown in FIGURES 7–9. This hinge comprises an elongated saddle 56, generally U-shaped in cross section, into one end of which the member 18 is fixed. The adjacent end of member 20 fits into the other end of saddle 56 and is provided with a hinge lug 58, which is pivotal on a hinge pin 60 through the saddle. A retaining pin 62 projecting on both sides of saddle 56 holds the central coils 64 of a torsion spring 66, the end of which engage the members 18 and 20 and bias the members upwardly into the saddle. The member 20 seats in the saddle 56 which acts as a stop and is held in axial alignment with the member 18 by the spring pressure. Other spring arrangements may be used, depending on the nature of the structural members.

A shroud line 68 with a clevis 70 is attached to hinge 54 by means of the tie plates 72, which can conveniently be held on hinge pin 60.

The inner and outer spreader bar members 36 and 38 on each side are connected by a spring biased hinge 74, similar in all respects to hinge 54 except that no shroud line is attached. There are only three spring biased hinges in the structure, the others being free swinging.

Figure 10:
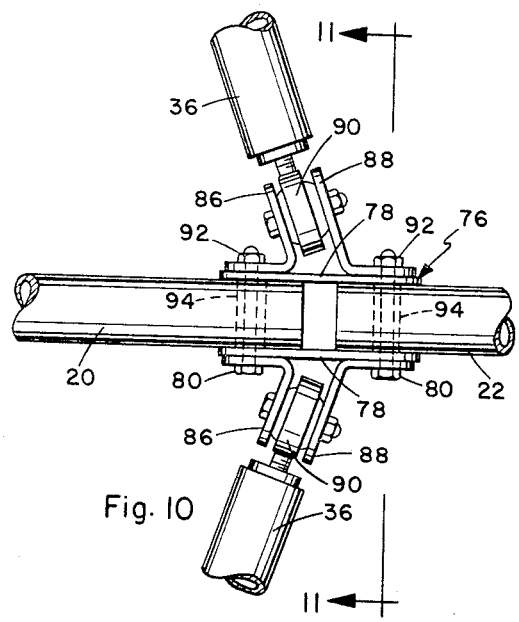
FIGURE 10 is a top plan view of a compound hinged joint.
Figure 11:
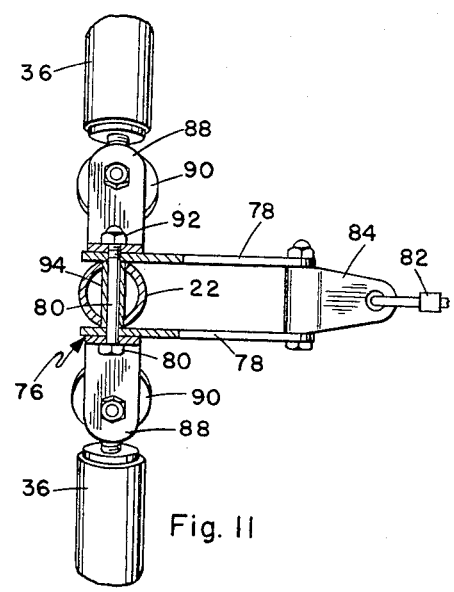
FIGURE 11 is a sectional view taken on line 11—11 of FIGURE 10.

The third type of hinge, shown in FIGURES 10 and 11, is the compound hinge 76 used at the junction of keel members 20 and 22 with the spreader bar inner members 36. Keel members 20 and 22 are connected by hinge plates 78 with hinge pins 80, similar to the arrangement of the simple hinge 44, with a shroud line 82 attached by a clevis 84. On each side of the keel are paired angle brackets 86 and 88 held by the hinge pins 80, the inner members 36 having pivotal end fittings 90 which are secured in the angle brackets. To hold the angle brackets securely the hinge pins 80 are shown as bolts with securing nuts 92 clamping tightly against sleeves 94, on which the members 20 and 22 pivot.

The junctions of members 30 and 32 with the spreader bar outer members 38 are made with hinges 96 similar to hinges 76, except that angle brackets are used on one side only. For freedom of movement without binding the panels 16 are provided with cutouts 98 at all hinges.

Shroud lines 100 are connected to hinges 96, shroud lines 102 are attached by simple brackets 104 to the rear ends of members 34, a shroud line 106 is attached in a similar manner to the rear end of keel member 24, and a final shroud line 108 is secured to apex fitting 40. All movable points on the wing frame are thus held by shroud lines, the relative lengths of which control the extended shape of the wing by holding the structure members substantially in a common place. This avoids the necessity for using elaborate stops and locks on all hinges, since the aerodynamic loads on the wing in flight will maintain tension on all shroud lines.

Figure 12:
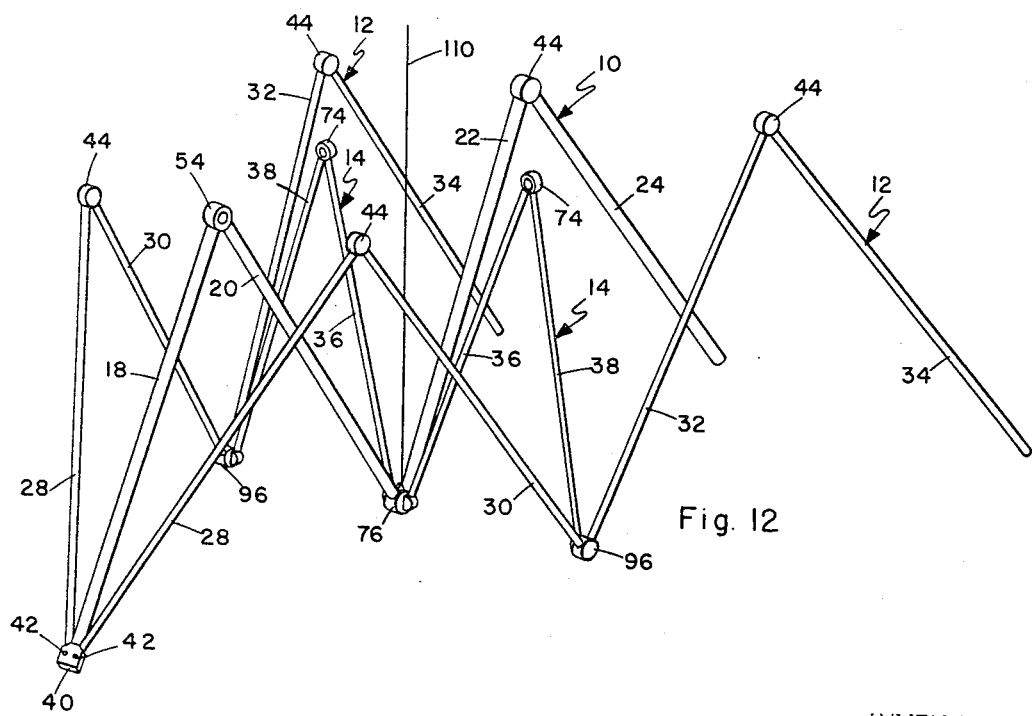
FIGURE 12 is a diagram of the complete basic supporting frame showing the hinge arrangement.

The wing is collapsed by folding the members at the spring biased hinges 54 and 74 downwardly, whereupon the remainder of the frame structure will fold naturally, as in FIGURE 12. Keel 10 and leading edge members 12 are accordion folded and the leading edge members swing in against the keel as the spreader bars 14 fold. The entire frame will pack into a bundle with the members all in substantially parallel relation, the panels 16 being folded in any suitable manner. A static line 110 is attached to the hinge 76 to extract the wing from its stowage.

The folded wing is stowed in a pack 112, which may be attached to or incorporated in a payload container 114, the shroud lines being collectively secured in the pack in any suitable manner, as in a parachute. Pack 112 is closed by parachute type flaps 116 held by quick release pins 118, which are all attached to a ripcord 120 coupled to static line 110, as in FIGURE 3.

The unit is air dropped conventionally with the static line 110 restrained in the aircraft, so that as the unit falls the pins 118 are pulled out and the wing extracted by the tension on the static line. The spring action of hinges 54 and 74 opens the forward portion of the wing and air flow completes the opening. As soon as the shroud lines pull tight the load breaks the static line 110 in the usual manner and the wing is in free flight with its payload.

While the wing can be fully extended in one stage, it may be desirable to reduce the shock load by an initial partial opening and stabilization stage. The foldable frame structure lends itself very effectively to the deployment technique described in the above mentioned U.S. Patent No. 3,141,640, in which the wing is partially opened and restrained by certain shroud lines into a parachute-like configuration. This position is held only momentarily, but is sufficient to absorb much of the deceleration shock and to stabilize the unit for gliding flight.

In the present configuration the wing can be held initially in a parachute-like stage by reefing or restraining shroud lines 100, 102, 106 and 108 while the rest are left slack. This holds down spaced portions of the periphery of the wing and allows the panels 16 to balloon upwardly under air load, as in FIGURE 4. As described in the above mentioned patent, the reefed shroud lines are subsequently released and the wing opens to its full extension. The extended wing is a stable aerodynamic platform and will immediately assure gliding flight.

If it is desired to guide the payload to a specific location, the wing can be controlled by retracting and extending certain of the shroud lines to change the contours of panels 16 and cause air flow variations which will maneuver the wing. This can be accomplished by radio control or by some type of programmed device. The technique is well known and has been used on various models and full size aircraft. At the end of the flight the wing can be flared to reduce forward and vertical speed and ensure a soft landing. Means for accomplishing at least pitch control of the wing in flight and initiating an automatic terminal flare maneuver are contained in U.S. Patent No. 3,102,703, entitled, Automatic Trim Control for Towed Aircraft.

The simple structure can be hnadled, serviced and packed by relatively unskilled personnel and damaged components are easily replaced. The wing can be stored for long periods in the folded condition and is ready for immediate use. By incorporating the wing stowage and the flight control means, if used, into a self-contained pack, the unit can be attached in any convenient manner to a variety of payloads.

It is understood that minor variation from the form of the invention disclosed herein may be made without departure from the spirit and scope of the invention, and that the specification and drawings are to be considered as merely illustrative rather than limiting.

I claim:
1. Aerial cargo delivery means, comprising:
   a wing having a supporting frame including a longitudinal central keel, leading edge members attached at their forward ends to the forward end of said keel, spreader bars pivotally connected to and between said keel and said leading edge members on opposite sides of the keel to spread the leading edge members angularly outwardly from the keel;
   flexible lifting panels secured to and between said keel and said leading edge members;
   said leading edge members being pivotally attached to said keel to swing laterally on opposite sides thereof;
   said spreader bars having hinges intermediate their ends;
   said keel and said leading edge members having correspondingly longitudinally spaced hinges;
   all of the hinges of said keel, said leading edge members and said spreader bar, with the exception of those connecting the leading edge members to the keel, having their axes substantially in the common plane of the supporting frame;
   attachment means for attaching said wing to a payload; and
   a plurality of shroud lines secured to said attachment means and being connected at spaced positions to said keel and leading edge members, the relative length of the shroud lines being such that said keel and leading edge members are held substantially in a common plane by the shroud lines in the extended position of the wing.

2. The structure according to claim 1, wherein said spreader bar hinges and at least one hinge in the forward portion of said keel have stop means to hold the respective connected members extended and spring means biasing the members to extended positions.

3. The structure according to claim 1, wherein said spreader bars are pivotally connected to said keel and leading edge members at hinge positions thereof.

4. The structure according to claim 1, wherein a shroud line is connected at each hinge position on said keel and leading edge members.

References Cited

UNITED STATES PATENTS

| 1,200,585 | 10/1916 | Chambers | 244—149 |
| 3,198,458 | 8/1965 | Fink | 244—49 |

OTHER REFERENCES

Libbey, C. E.: NASA Technical Note D-2044, December 1963, pp. 2, 3, 9, 10, 13, 16, 17, 18, and 19.

MILTON BUCHLER, *Primary Examiner.*

R. A. DORNON, *Assistant Examiner.*